Figure 1:
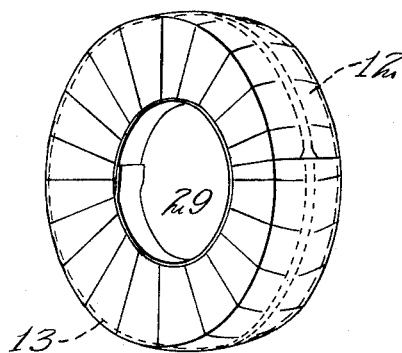

Oct. 26, 1965    J. F. OLSON    3,214,011
TIRE COVER
Filed Jan. 3, 1963

INVENTOR
JEROME F. OLSON
BY
ATTORNEY

United States Patent Office 3,214,011
Patented Oct. 26, 1965

3,214,011
TIRE COVER
Jerome F. Olson, South St. Paul, Minn., assignor to Waldorf Paper Products Company, St. Paul, Minn., a corporation of Minnesota
Filed Jan. 3, 1963, Ser. No. 249,162
1 Claim. (Cl. 206—46)

This invention relates to an improvement in tire cover and deals particularly with a covering of flexible material such as paper or paperboard which is wrapped about the tire casing to protect it from the elements between the time it is produced and the time it is sold to the ultimate user.

When tire casings are produced, in most instances, they are wrapped, usually by a strip of paper or paperboard which is wrapped spirally around the body of the tire. This wrapping tends to resist moisture and prevent the checking of the surface of the tire by exposure to the sun. When the tire is to be used, the wrapping is split, usually by bouncing the periphery of the tire to cause expansion of the tire, thereby splitting the wrapping tape so that it can be readily discarded. While such wrappings have been successfully used for a great number of years, a considerable amount of paper is required due to the overlapping of the convolutions of the paper, and due to the fact that the wrapping process is relatively slow. Furthermore, the process requires the use of very expensive machinery, partially because the slow speed of the wrapping operation required that numerous wrapping machines be used in most tire plants.

It is an object of the present invention to provide a tire wrap which is formed of a generally rectangular sheet of paperboard which may be of the type presently being used. This sheet is creased, preferably through the use of a cylindrical die, for form a series of spaced substantially triangular gusset flaps on each side of the center of the sheet and spaced longitudinally thereof. The sheet is preferably of sufficient length to encircle the crown of the tire or in other words is slightly longer than the outer circumference of the tire. The triangular gusset flaps or panels are so proportioned that when these triangular panels are folded into face contact with the portion of the sheet between the triangular panels, the inner diameter of the sheet when wrapped about the tire is approximately the same as the inner diameter of the tire casing. By securing the longitudinal edges of the sheet together, an effective one-piece wrapper is produced.

A further feature of the present invention resides in the provision of a construction of the type described in which opposite longitudinal edges of the sheet are creased to provide generally triangular gusset panels which have their base along the sheet edge and have their inner extremities spaced from the longitudinal center line of the sheet. This arrangement permits the center portion of the sheet to fold over the relatively flat but slightly bowed crown of the tire, and then to fold neatly over the outwardly bowed side walls of the tire to lie inwardly of the tire mounting rims of the tire or the beads which engage the tire rims.

A feature of the present invention resides in the provision of a covering sheet of the type described in which the generally triangular gusset panels are defined by crease lines which converge to a point closely spaced apart at the edge of the crown. At this point toward the center line of the sheet, the crease lines taper at a decreased angle to compensate for the slight bowing of the tire crown.

An added feature of the present invention resides in the fact that, if desired, a tear strip or rip tape may be provided along the longitudinal center line of the sheet which may be removed to facilitate the removal of the tire covering.

An added feature of the present invention resides in the fact that when wrapped about the tire casing, the longitudinal marginal edges of the sheet may be either secured together by a fastening tape, or may be adhered in overlapping relation. The latter method is preferable as it is more economical. On the other hand, the taped joint is somewhat to be preferred from a standpoint of appearance.

These and other objects and novel features of the present invention will be more clearly and fully set forth in the following specification and claims.

Figure 2:
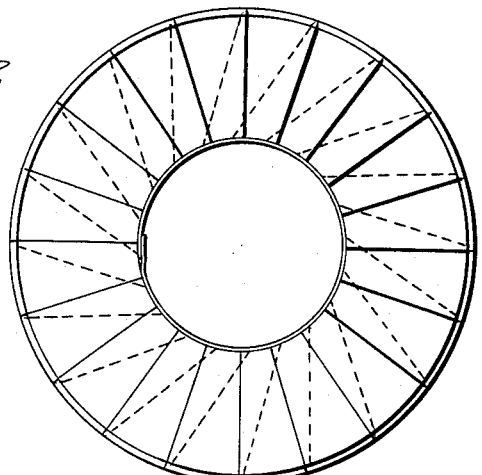
Figure 4:
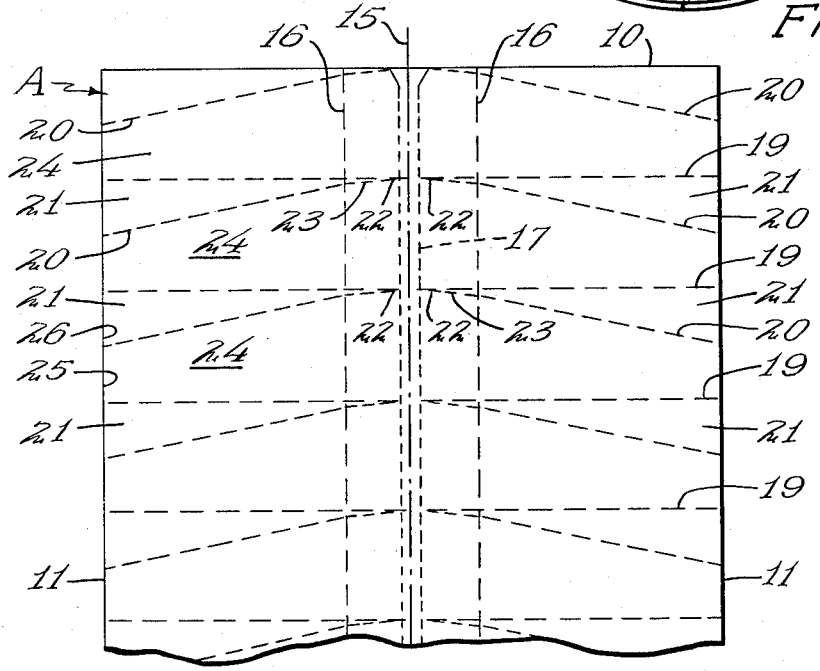
Figure 3:
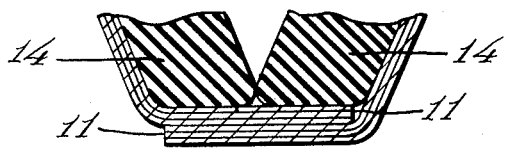

In the drawings forming a part of the specification;
FIGURE 1 is a perspective view of a wrapped tire showing the general arrangement of the covering.
FIGURE 2 is a side elevational view of the tire shown in FIGURE 1.
FIGURE 3 is a sectional view through a portion of the tire and covering showing the manner in which the marginal edges of the sheet may overlap and be adhered together.
FIGURE 4 is a diagrammatic view of the sheet from which the tire covering is formed.

A portion of the wrapping sheet is shown in general at A in FIGURE 4 of the drawings. Only one end of the sheet is shown, as the sheet is the same throughout its length. Normally, the sheet is formed from a web of paperboard or the like, creased by cylindrical dies, and cut off at predetermined lengths to form the sheet ends such as 10. The longitudinal side edges of the sheet are indicated at 11. It is obvious that the creasing must vary to some extent to fit about tires of different cross-sectional shapes. However, in general, the tires include a substantially flat but slightly outwardly bowed crown portion 12, and outwardly bowed side walls 13 which terminate in closely spaced rims on enlarged beads 14 which are designed for mounting upon the rims of the wheels. Normally, these rims or beads 14 are spaced apart a substantial distance, but during storage and sale, these portions 14 are drawn together and held in this position by the wrapping.

The center line of the sheet A is indicated by the numeral 15. This center line 15 is designed to overlie the center of the crown portion 12 of the tire, and usually this center line is midway between the side edges 11 of the sheet, although if preferred, one side of the sheet may be wider to serve as the overlapping edge. In any event, the center line 15 may be described as such, as it should overlie the center of the tire crown.

Normally the sheet A is provided with a pair of longitudinally extending parallel crease line 16 which are spaced apart a distance substantially equal to the width of the tire crown 12. These crease lines 16 are intended to simplify the folding of the side edges of the sheet about the outwardly bowed tire side walls 13. If desired, a relatively narrow strip of tape 17 may be adhered or otherwise secured on the under surface or inner surface of the sheet along the center line 15. Alternatively, this strip may be a cord, or the sheet A may be perforated on either side of the center line 15 along the length of the sheet to permit a removable portion. However, if a tear strip is employed, a tape or cord is somewhat preferable so that the sheet will remain imperforate.

In the particular arrangement illustrated, the sheet A is provided with transversely extending parallel score lines 19 which extend entirely across the sheet normal to the side edges thereof. Angularly extending converging score lines 20 extend inwardly from opposite edges of the sheet, converging toward the fold lines 19 to form generally triangular gusset panels 21 between each pair of adjoining converging fold lines 19 and 20. The bases of these generally triangular panels 21 are along the side edges 11 of the sheet, and the apex of each triangular panel is preferably near to, but spaced from, the center line 15. As indicated in the drawings, the fold lines 20 preferably extend to a point closely adjacent to the adjoining transverse fold line 19 at the point of intersection with a fold line 16, and from this point to the apex 22, the fold line converges at a lesser angle as indicated at 23. Thus the gusset panels 21 are not truly triangular, but are generally triangular in shape.

With this arrangement, the areas between the sheet edges 11 and the fold lines 16 may be considered to be divided by the fold lines 20 to a generally triangular gusset panel 21 and a trapezoidal panel 24, the shorter outer edges 25 of the trapezoidal panels 24 lying along the sheet edges 11. Under normal circumstances, these shorter edges 25 of the trapezoidal panels 24 are slightly greater in length than the base edges 26 of the generally triangular panels 21. Furthermore, where the sheet A at its center line 15 is of a length equal to the circumference of the crown of the tire, the combined length of the edges 25 of the trapezoidal panels 24 is approximately equal to the inner circumference of the tire rims 14. Thus when the triangular gusset panels 21 are folded into face contact with an adjoining trapezoidal panel 24, the inner portions of the sheet may be folded inwardly of the rims 14 as indicated in FIGURE 3. FIGURE 3 shows the sheet edges 11 overlapped and adhered together inwardly of the rims 14. If desired, the marginal edges of the sheet may be covered by a strip of tape such as 29. If the tape 29 is used, it may be possible to narrow the sheet so that the edges overlap to a lesser extent, or do not overlap at all. The tape 29 somewhat improves the appearance of the wrapped tire, but overlapping and adhering the sheet edges has been found somewhat less expensive.

In accordance with the patent statutes, I have described the principles of construction and operation of my improvement in tire cover, and while I have endeavored to set forth the best embodiment thereof, I desire to have it understood that changes may be made within the scope of the following claim without departing from the spirit of my invention.

I claim:
A tire cover for a tire generally horseshoe shaped in cross section and having a generally flat but slightly bowed crown, and outwardly bowed side walls terminating in closely spaced mounting rims, the cover including
- an elongated generally rectangular flexible sheet of covering material having a length at least equal to the outer circumference of the tire crown and a width at least equal to the cross-sectional periphery of the tire,
- a pair of spaced parallel longitudinally extending score lines extending through the length of said sheet and space a distance substantially equal to the width of the tire crown,
- substantially equally spaced pairs of score lines converging together toward the score lines and terminating in slightly spaced relation at the score lines,
- substantially equally spaced second pairs of score lines extending from the spaced ends of said first score lines and converging together toward the longitudinal center of the sheet at a lesser angle than the angle of convergence of said first pairs of converging score lines,
- said second pairs of score lines terminating at apexes spaced from the longitudinal center line of the sheet.

References Cited by the Examiner

UNITED STATES PATENTS

| | | | |
|---|---|---|---|
| 1,319,682 | 10/19 | Angier | 206—46 |
| 1,395,661 | 11/21 | Angier | 206—46 |
| 1,640,021 | 8/27 | Angier | 206—46 |
| 1,933,661 | 11/33 | Dale | 206—59 |
| 2,109,504 | 3/38 | Ringler | 206—46 |
| 2,348,084 | 5/44 | MacChesney et al. | 206—46 |
| 2,751,964 | 6/56 | Guyer | 229—51 |
| 2,955,738 | 10/60 | Bacchus et al. | 206—59 |
| 3,044,609 | 7/62 | Branick | 206—46 |

FOREIGN PATENTS

| | | |
|---|---|---|
| 537,287 | 6/41 | Great Britain. |

THERON E. CONDON, *Primary Examiner.*

EARLE J. DRUMMOND, *Examiner.*